3,084,498
RAKE AND BRUSH ATTACHMENT THEREFOR
Margaret Straley, 427 Countryside Drive, Wheaton, Ill.
Filed Sept. 11, 1961, Ser. No. 137,185
3 Claims. (Cl. 56—400.04)

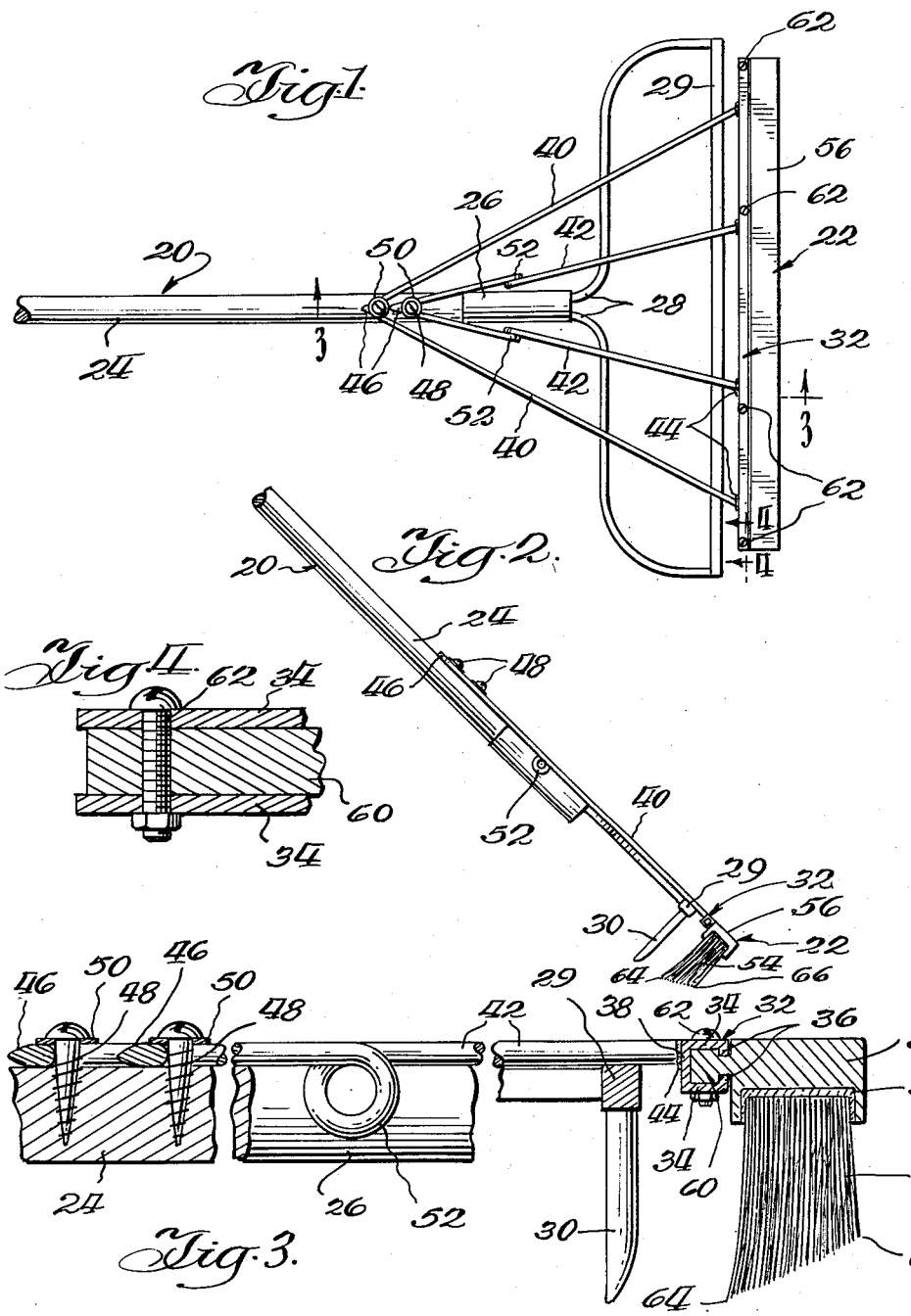

This invention relates generally to gardening tools and more particularly, relates to a novel brush attachment adapted to be mounted on a rake so as to enable lawns to be raked and swept concurrently with the same tool.

An important object of the invention is to provide a brush attachment of the character described which is adapted to be removably mounted with equal utility and facility on rakes either of the resilient or rigid tine type.

Another important object of the invention is to provide a combination rake and brush for lawns in which said brush is removably attached on the rake and arranged behind the tines of the rake to brush the same portions of the lawn concurrently with raking thereof.

Other objects of the invention are to provide a brush attachment of the character described in which said attachment is adapted to be resiliently mounted on the rake; in which the bristles of the brush are removably secured in a channel member so as to permit replacement of the bristles when worn; which is economical to manufacture and which is sturdy and durable.

The foregoing and other objects of the invention will become apparent as the disclosure thereof evolves. A preferred embodiment of the invention is described in detail in the specification and illustrated in the accompanying drawing in which it is contemplated that minor variations may occur without departing from the scope or sacrificing any of the advantages thereof.

In the drawing:

FIG. 1 is a fragmentary plan view of a rake having the brush attachment embodying the invention mounted thereon.

FIG. 2 is a fragmentary side elevational view showing the combination rake and brush tool of FIG. 1 in one position of use.

FIG. 3 is a sectional view taken through the combination tool along the line 3—3 of FIG. 1 and in the direction indicated.

FIG. 4 is a sectional view taken along the line 4—4 of FIG. 1.

Referring now to the drawing, the reference character 20 identifies a conventional rake upon which has been installed the brush attachment embodying the invention designated generally by the reference character 22. The rake 20 is of the stiff tine construction although it should be understood that this is exemplary only since the invention can be used as well with rakes of resilient tine construction. The handle 24 of the rake is of elongate, circular cross-section and mounts a ferrule 26 at one end thereof by means of which the rake tines are secured thereto. The wire arms 28 extend from the ferrule 26, and outwardly in opposite directions to connect with the bar 29 from which the rigid tines 30 of the rake depend at right angles thereto.

The brush attachment 22 is comprised of an elongate bracket or holder means 32 of generally channel-shaped cross-section. The bracket 32 is formed of metal and is comparable in length to the transverse span of the rake. The opposite legs 34 of the bracket have inwardly turned flanges 36 providing a reduced dimension passageway therebetween into the interior of the bracket and extending longitudinally along a side of the bracket. The connecting leg or web 38 of the bracket has a plurality of struts in the form of wire rods 40 and 42 welded at ends thereof to said web 38 as indicated at 44. Wire rods 40 and 42 respectively extend from said web 38 substantially at right angles thereto and are convergent one relative to the other where at their opposite converging ends 46 respectively they are secured on the upper side of the handle 24 by suitable mechanical fasteners, such as the screws 48 and washers 50. Instead of screws 48, clamps or bolts receiving wing nuts on their threaded ends can be employed to anchor the ends 46 on the handle 24. The rods 40 and 42 are substantially parallel to the handle 24 and the rods 40 and 42 respectively can be formed from a single length of wire. As illustrated, there are two rods 40 and two rods 42, making a total of four struts.

The rods 40 are arranged on the outside so that the rods 42 are located therebetween. Intermediate their ends and clearing the ferrule 26, said rods 42 are looped upon themselves as indicated at 52 so as to achieve desired spring resiliency for the brush attachment during use of the tool. The loops 52 are arranged in planes perpendicular to the plane of the major portions of the rods 42.

The rods 40 and 42 are sufficiently long so that when the attachment 22 is installed, the bracket 32 is located behind the tines 30 of the rake considered from the handle 24. The brush, per se, comprises a plurality of bristles 54 arranged side by side in a row and secured in a backing member 56 by suitable means 58. Said backing member 56 has an elongate tongue 60 of a cross-section matching cross-section of the bracket 32 and the length of the tongue 60 is substantially similar to the length of the bracket. Thus, the tongue 60 can be slided into mating engagement with the channel bracket 60 from either open end of the bracket and secured against dislodgement therefrom by fasteners 62 passed into suitable openings in the legs 34 of the bracket.

As seen in FIGS. 2 and 3, the bristles depend downwardly from the backing member 56 parallel with the tines 30 and with their free ends lying along a diagonal line commencing from the edge 64 closest to the tines 30 and terminating at the edge 66. The edge 66 is spaced from the member 56 a distance less than the edge 64. Thus, when the combined tool is used in a canted position as seen in FIG. 2, the varying length of bristles 54 will facilitate brushing of the lawn after raking.

The bracket 32 and backing member 56 preferably are formed of metal for easy fabrication thereof. The dimensions of these members are selected so that the brush bristles 54 will be substantially coextensive with the transverse span of the rake whereby after the tines have raked, the bristles follow to brush the same area. Worn out bristles can be replaced by removing the fasteners 62 and sliding the tongue 60 out of the bracket and substituting a new backing member 56 with new bristles. The loops 52 serve to hold the brush attachment resiliently engaged on the rake and aid in the brushing or sweeping action of the bristles. The tongue 60 is sufficiently strong to support the backing member 56 and bristles properly during use of the tool.

It will be seen that the brush attachment 22 permits the combination tool to be used concurrently as a rake and brush without necessitating turning or twisting of the brush attachment in order to bring it into proper operating alignment or position. The bristles brush immediately after the tines of the rake so that no separate brushing strokes are required of the combination tool. The attachment also is relatively light in weight so that the overall weight of the combined tool is not prohibitive. The substantially universal mounting character of the brush attachment 22 enables raking with either a spring tine or rigid rake with equal facility and efficiency and yet, because said attachment 22 is removably installed on the rake, the rake can be used separately. Thus, a separate brush or broom or sweeper for leaves, lawn clippings and the like is not required as a result of installation of the brush attachment 22 on a rake.

It may be noted that the channel-shaped bracket can be arranged to open in another direction so long as the backing member is provided to properly engage therein to face the bristles in the desired direction relative to the rake tines.

It is believed that the invention has been described in sufficient detail to enable the skilled artisan to understand and practice the invention. In the claims appended hereto, the invention has been pointed out in language intended to be broadly and liberally construed commensurate with the achievement in the arts and sciences contributed thereby.

What it is desired to secure by Letters Patent of the United States is:

1. A brush attachment adapted to be secured on the handle of a rake comprising, an elongate bracket having a plurality of wire struts secured at ends thereof to said bracket and extending outwardly therefrom to converge at their opposite ends respectively, said convergent opposite ends adapted to be secured on said handle spaced from and on one side of the tines of the rake, and a brush member secured to said bracket, said attachment adapted to be secured on said handle with the bristles substantially parallel with and on the opposite side of the tines, said brush member having a backing member provided with a protruding, elongate tongue, and said bracket having an elongate channel, said tongue being matingly engaged in said channel, at least two of said struts each having an intermediate loop portion arranged in a plane normal to the length of the strut of which it is a part so as to enable the attachment to be resiliently secured on said handle.

2. A brush attachment adapted to be secured on the handle of a rake comprising, an elongate bracket having a plurality of wire struts secured at ends thereof to said bracket and extending outwardly therefrom to converge at their opposite ends respectively, said convergent opposite ends adapted to be secured on said handle spaced from and on one side of the tines of the rake, and a brush member secured to said bracket, said attachment adapted to be secured on said handle with the bristles substantially parallel with and on the opposite side of the tines, said brush member having a backing member provided with a protruding, elongate tongue, and said bracket having an elongate channel, said tongue being matingly engaged in said channel, the bristles of said brush member having free ends arranged along a diagonal plane relative to the handle of the rake when the attachment is so secured.

3. A dual-purpose garden tool comprising, an elongate handle having raking tines secured to one end of the handle, and a brush attachment removably secured to an upper surface of said handle, said attachment including a brush member spaced outwardly from said raking tines, said brush member having the bristles thereof substantially parallel to said tines and removably secured on said brush member, said attachment having resilient wire strut means connecting the same to said handle, including a pair of struts each having an intermediate loop portion, said loops being located on opposite sides of said handle, each loop being arranged facing downwardly in a plane perpendicular to the length of the strut of which it is a part, said bristles having the free ends thereof arranged along a diagonal plane extending upwardly and in a direction away from the tines.

References Cited in the file of this patent

UNITED STATES PATENTS

| | | |
|---|---|---|
| 559,510 | Bridwell | May 5, 1896 |
| 951,024 | Parker | Mar. 1, 1910 |
| 1,049,242 | Krueger | Dec. 31, 1912 |
| 1,284,992 | Belknap | Nov. 19, 1918 |
| 2,146,437 | Mullett | Feb. 7, 1939 |

FOREIGN PATENTS

| | | |
|---|---|---|
| 550,670 | Great Britain | Jan. 19, 1943 |